(12) United States Patent
Iwasaki et al.

(10) Patent No.: US 9,936,136 B2
(45) Date of Patent: Apr. 3, 2018

(54) LENS BARREL

(71) Applicant: Panasonic Intellectual Property Management Co., Ltd., Osaka (JP)

(72) Inventors: Shinichi Iwasaki, Osaka (JP); Akira Koga, Osaka (JP); Kiyokazu Ishiyama, Yamagata (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/354,471

(22) Filed: Nov. 17, 2016

(65) Prior Publication Data

US 2017/0150057 A1 May 25, 2017

(30) Foreign Application Priority Data

Nov. 25, 2015 (JP) ................. 2015-229704

(51) Int. Cl.
| | | |
|---|---|---|
| *G02B 7/10* | (2006.01) | |
| *H04N 5/232* | (2006.01) | |
| *G02B 27/64* | (2006.01) | |
| *G02B 7/02* | (2006.01) | |

(52) U.S. Cl.
CPC ......... *H04N 5/23287* (2013.01); *G02B 7/026* (2013.01); *G02B 27/646* (2013.01); *G02B 7/10* (2013.01)

(58) Field of Classification Search
CPC . G02B 7/00; G02B 7/02; G02B 7/021; G02B 7/023; G02B 7/026; G02B 7/04; G02B 7/09; G02B 7/10; G02B 7/105; G02B 7/20; G02B 7/22; G02B 27/64; G02B 27/646; G02B 2027/0149; G02B 2027/015; G02B 2027/0152; G02B 2027/0154; H05N 5/23287
See application file for complete search history.

(56) References Cited

U.S. PATENT DOCUMENTS

| | | | | |
|---|---|---|---|---|
| 6,967,784 | B2 * | 11/2005 | Ichino .................... | G02B 7/021 359/694 |
| 2007/0177046 | A1 * | 8/2007 | Makii ...................... | G02B 7/08 348/335 |
| 2010/0002316 | A1 * | 1/2010 | Nomura ................. | G02B 7/021 359/817 |
| 2010/0165480 | A1 | 7/2010 | Yamaguchi et al. | |
| 2012/0257291 | A1 * | 10/2012 | Suzuki .................. | G02B 7/102 359/813 |

FOREIGN PATENT DOCUMENTS

JP 2010-152145 A 7/2010

* cited by examiner

*Primary Examiner* — Thong Nguyen
(74) *Attorney, Agent, or Firm* — Renner Otto Boisselle & Sklar, LLP

(57) ABSTRACT

Lens barrel 3 is provided with a first lens frame (first group lens frame 10) holding a first lens group (first group lens G1), a second lens frame (second group lens frame 20) holding a second lens group (second group lens G2), and resilient members (leaf springs 14). Second lens frame 20 is disposed inside of first lens frame 10, and furthermore, can be moved relatively to first lens frame 10 in the direction of optical axis AX. The resilient members (leaf springs 14) are disposed between first lens frame 10 and second lens frame 20 in such a manner as to urge second group lens frame 20 inward against first lens frame 10.

2 Claims, 12 Drawing Sheets

LENS BARREL

BACKGROUND

1. Technical Field

The present disclosure relates to a lens barrel.

2. Description of the Related Art

PTL 1 (Unexamined Japanese Patent Publication No. 2010-152145) discloses a high-performance zoom lens system having a blur correcting function of optically correcting an image blur caused by camera shake, vibrations, or the like, and a camera using the zoom lens system. The zoom lens system includes a first lens group having a negative power, a second lens group having a positive power, a third lens group having a negative power, and a fourth lens group having a positive power arranged in this order from an object side to an image side. In zooming from a wide-angle end to a telescopic end during picking up an image, at least the second lens group and the third lens group are moved along an optical axis to change magnification. The fourth lens group or a sub lens group that is a part of the fourth lens group is moved in a direction perpendicular to the optical axis.

SUMMARY

The present disclosure provides a lens barrel in which an image blur caused by a vibration peculiar to a flying object can be reduced in the case where a pickup device is mounted on the flying object so as to pick up an image.

A lens barrel in the present disclosure includes: a first lens frame holding a first lens group; a second lens frame holding a second lens group; and a resilient member. The second lens frame is disposed inside of the first lens frame, and furthermore, can be moved relatively to the first lens frame in the direction of an optical axis. The resilient member is disposed between the first lens frame and the second lens frame in such a manner as to urge the second lens frame inward against the first lens frame.

With the lens barrel according to the present disclosure, in the case where a pickup device using the lens barrel is mounted on a flying object so as to pick up an image, it is possible to reduce an image blur caused by a vibration peculiar to the flying object.

DETAILED DESCRIPTION

An illustrative exemplary embodiment will be described below in detail with reference to the attached drawings.

<1. Outside Appearance of Pickup Device>

Figure 1:
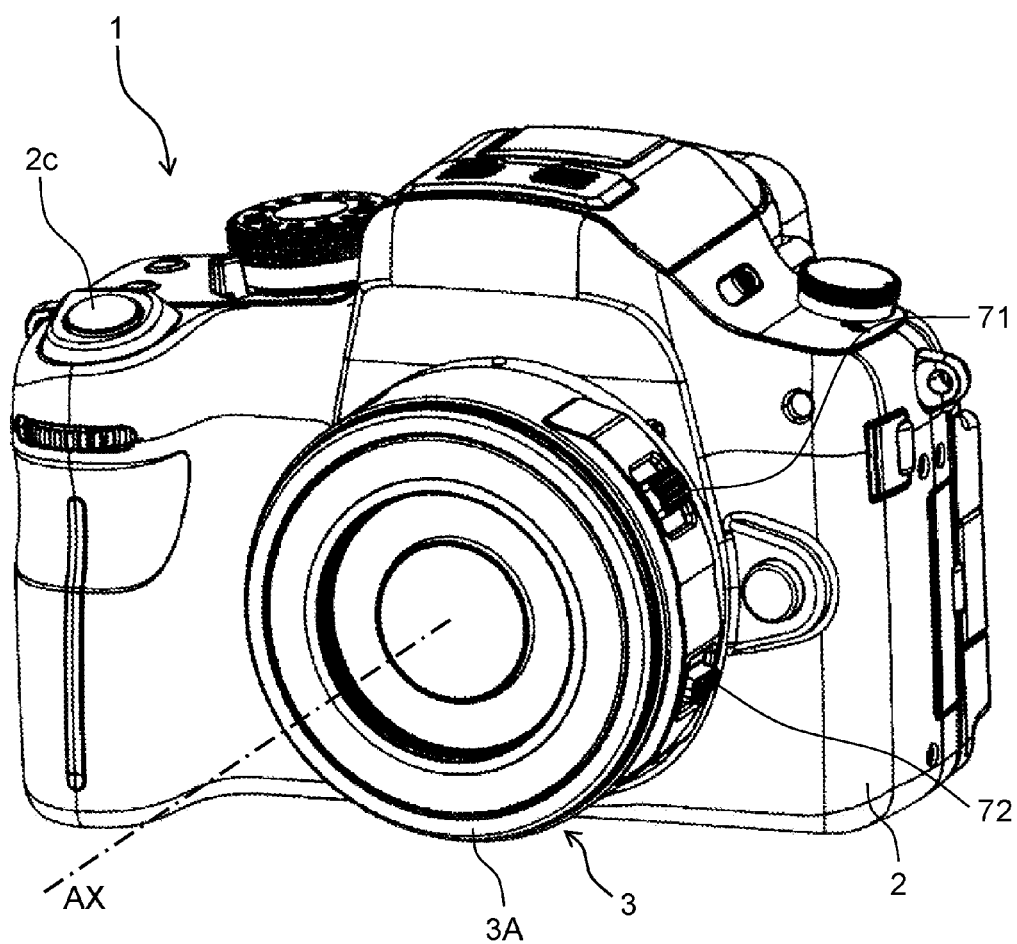
FIG. 1 is a perspective view showing a pickup device according to an exemplary embodiment.

FIG. 1 is a perspective view showing pickup device 1 in an exemplary embodiment. As shown in FIG. 1, pickup device 1 is a digital camera of a lens replacement type. Pickup device 1 is provided with camera main body 2 and lens barrel 3 that is detachably attached to camera main body 2. In the present exemplary embodiment, for the sake of convenience, description will be made on condition that the front represents an object side in the direction of optical axis AX of lens barrel 3; the rear, a side of camera main body 2 in the direction of optical axis AX; the right, a right side as viewed from an object in the direction of optical axis AX; and the left, a left side as viewed from the object in the direction of optical axis AX. Unless otherwise described, a circumferential direction represents a circumferential direction around optical axis AX, and a radial direction represents a radial direction on optical axis AX.

Figure 2:
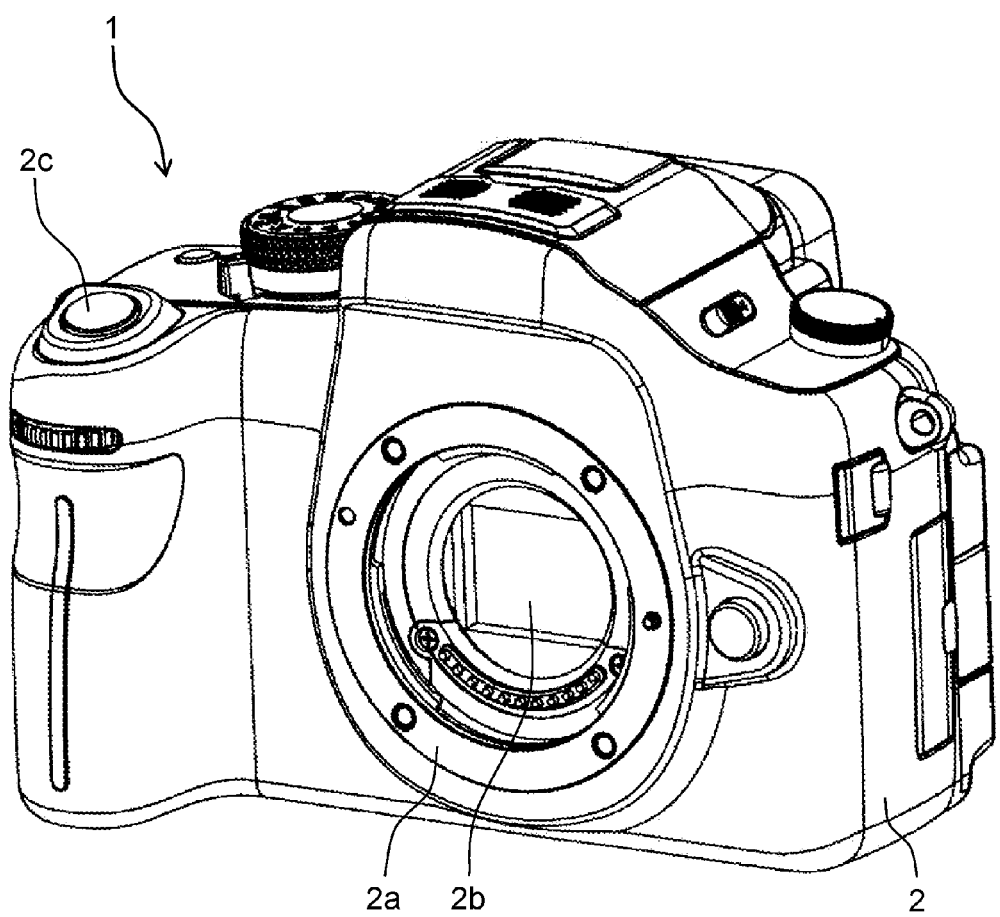
FIG. 2 is a perspective view showing a camera main body when a lens barrel according to the exemplary embodiment is detached.

FIG. 2 is a perspective view showing camera main body 2 when lens barrel 3 (see FIG. 1) in the exemplary embodiment is detached. As shown in FIG. 2, camera main body 2 includes body mount 2a, to which lens barrel 3 is to be fixed, pickup element 2b that picks up an optical image formed at lens barrel 3 and then converts the optical image into image data, and shutter button 2c.

<2-1. Configuration of Lens Barrel>

Figure 3:
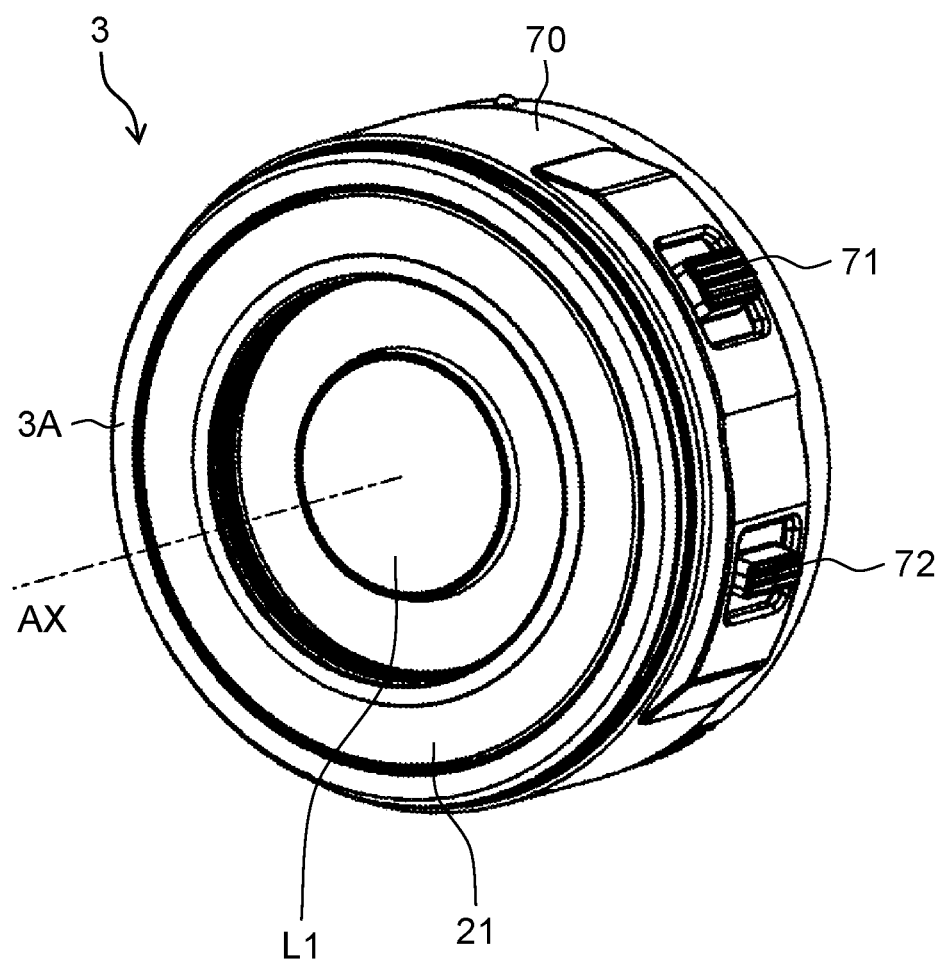
FIG. 3 is a perspective view showing the lens barrel according to the exemplary embodiment, as viewed slantwise from the front.
Figure 4:
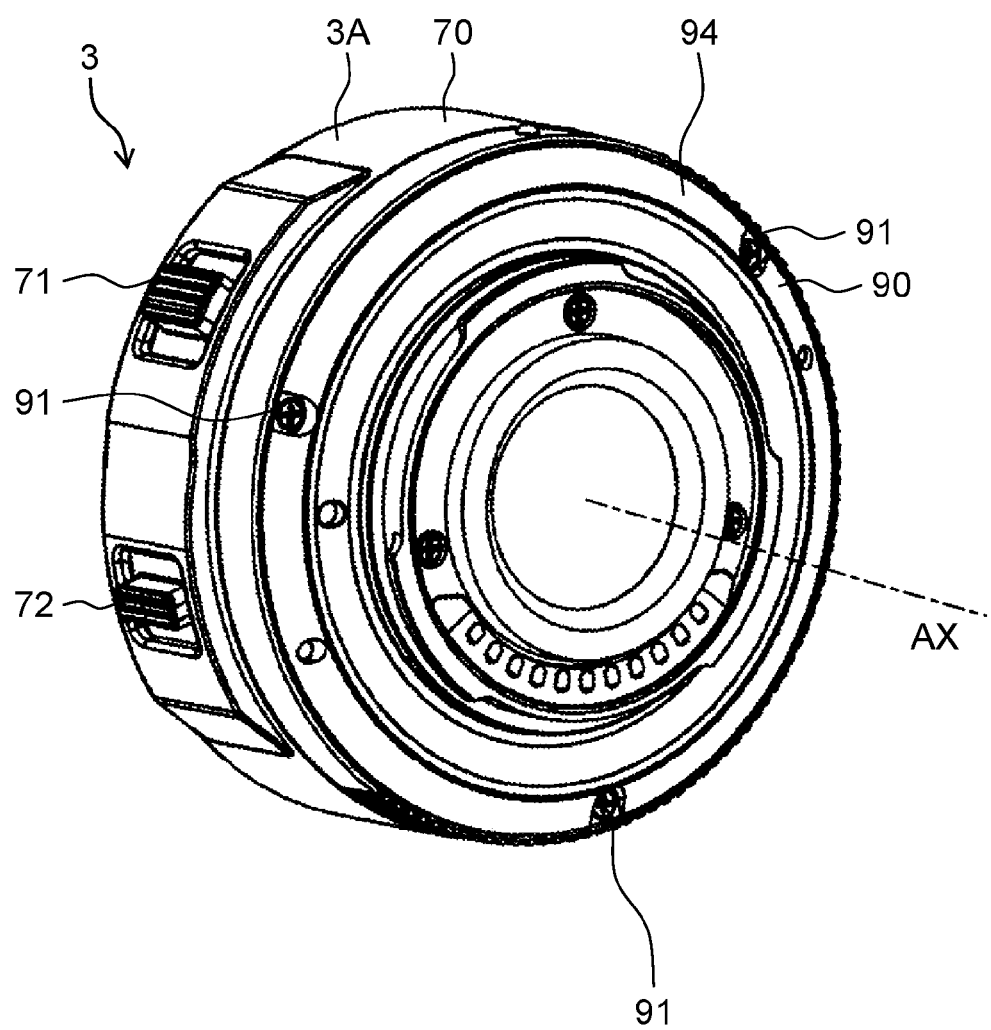
FIG. 4 is a perspective view showing the lens barrel according to the exemplary embodiment, as viewed slantwise from the back.
Figure 5:
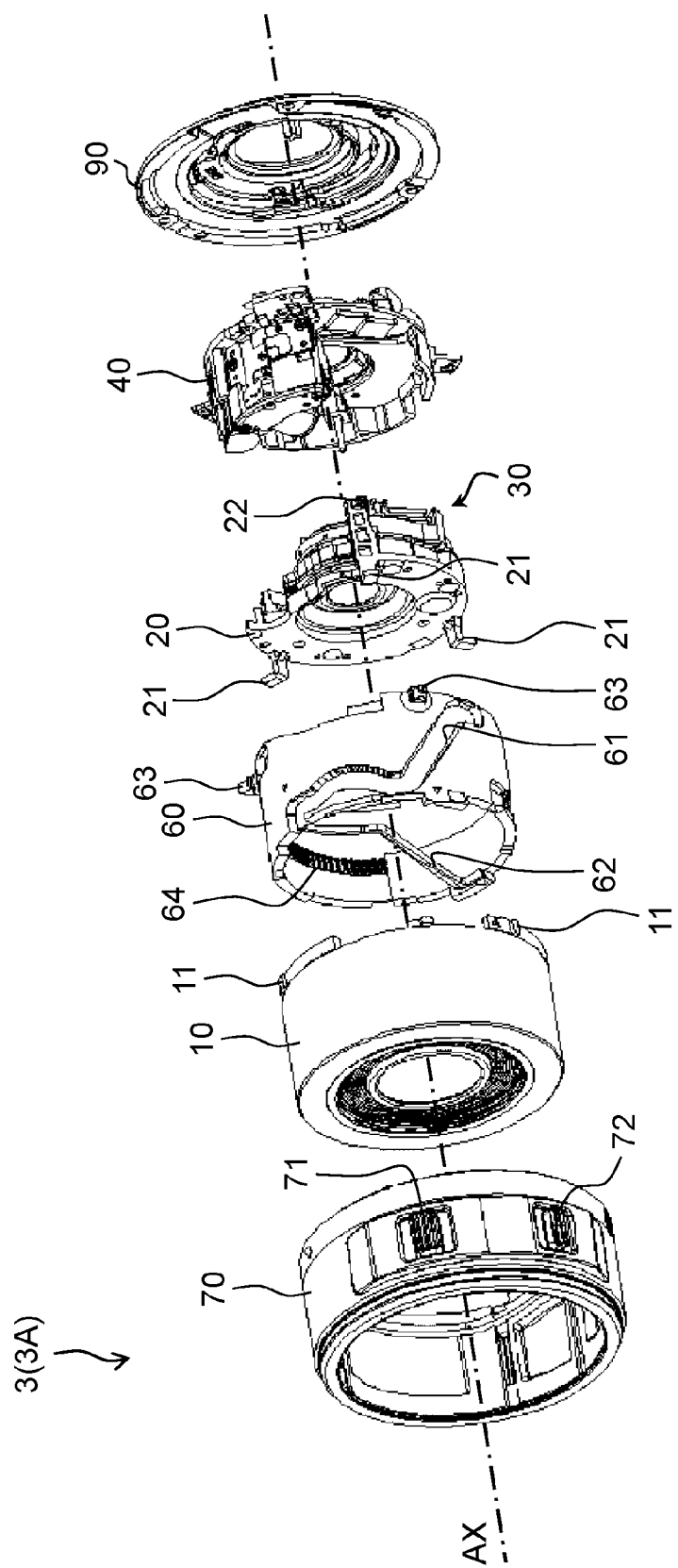
FIG. 5 is an exploded perspective view showing the lens barrel according to the exemplary embodiment.
Figure 6:
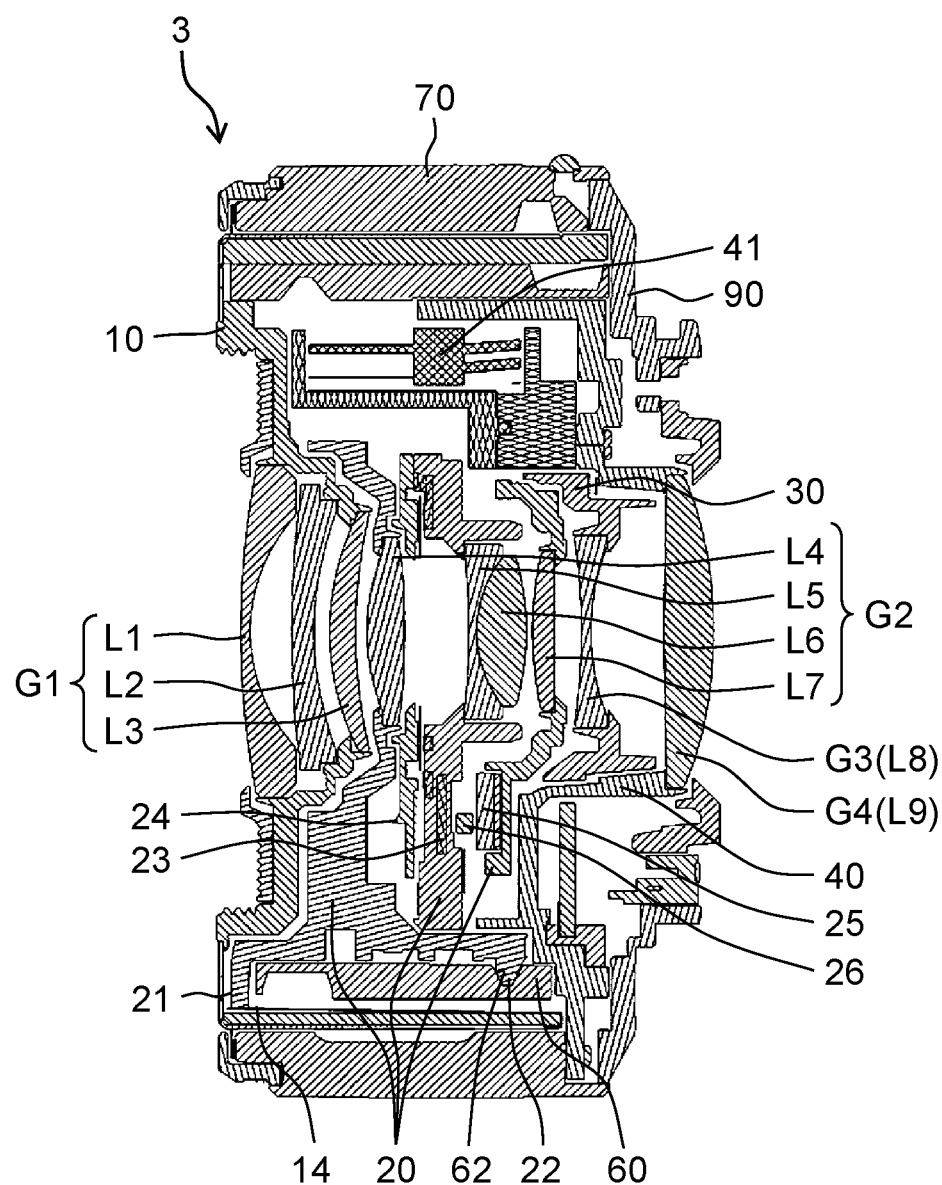
FIG. 6 is a cross-sectional view showing the lens barrel in a stored state according to the exemplary embodiment.
Figure 7:
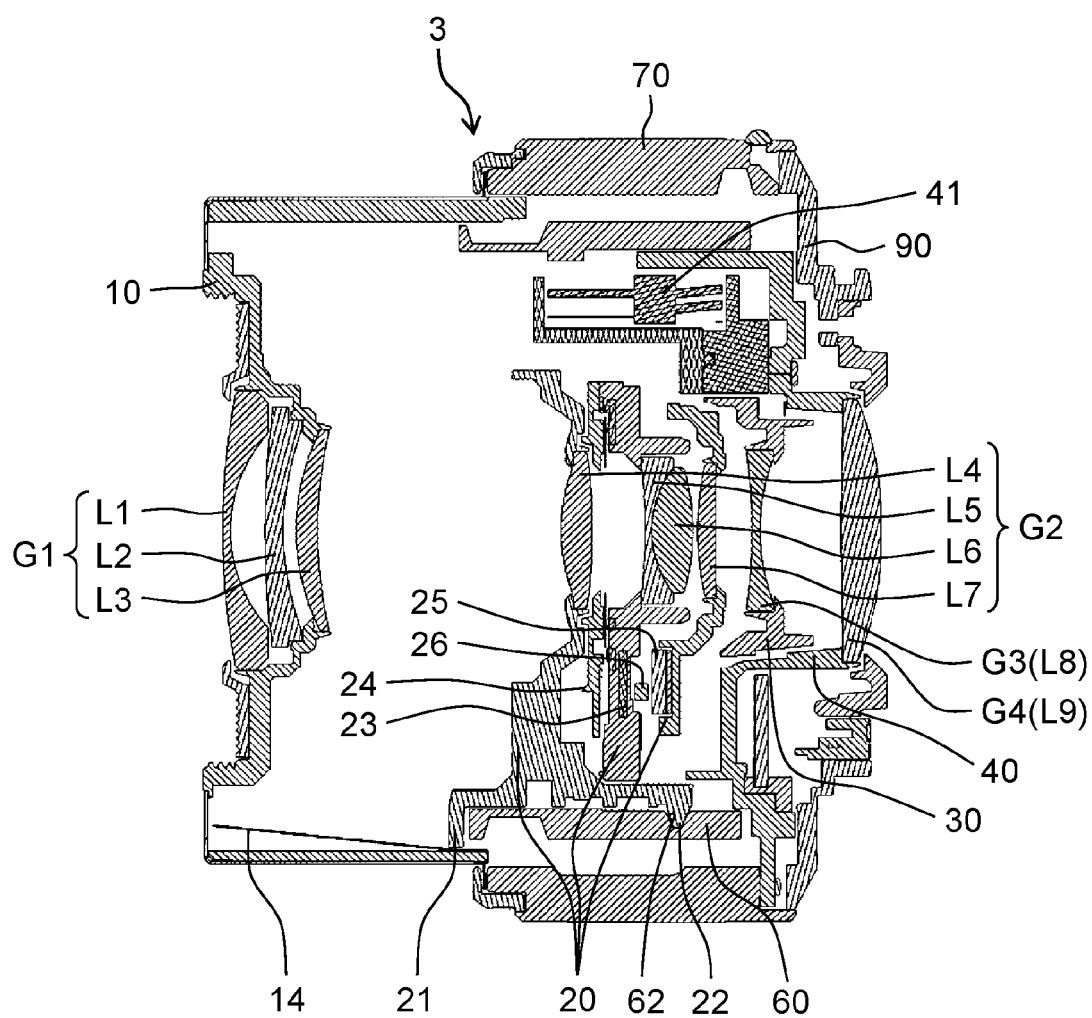
FIG. 7 is a cross-sectional view showing the lens barrel at a wide angle end according to the exemplary embodiment.
Figure 8:
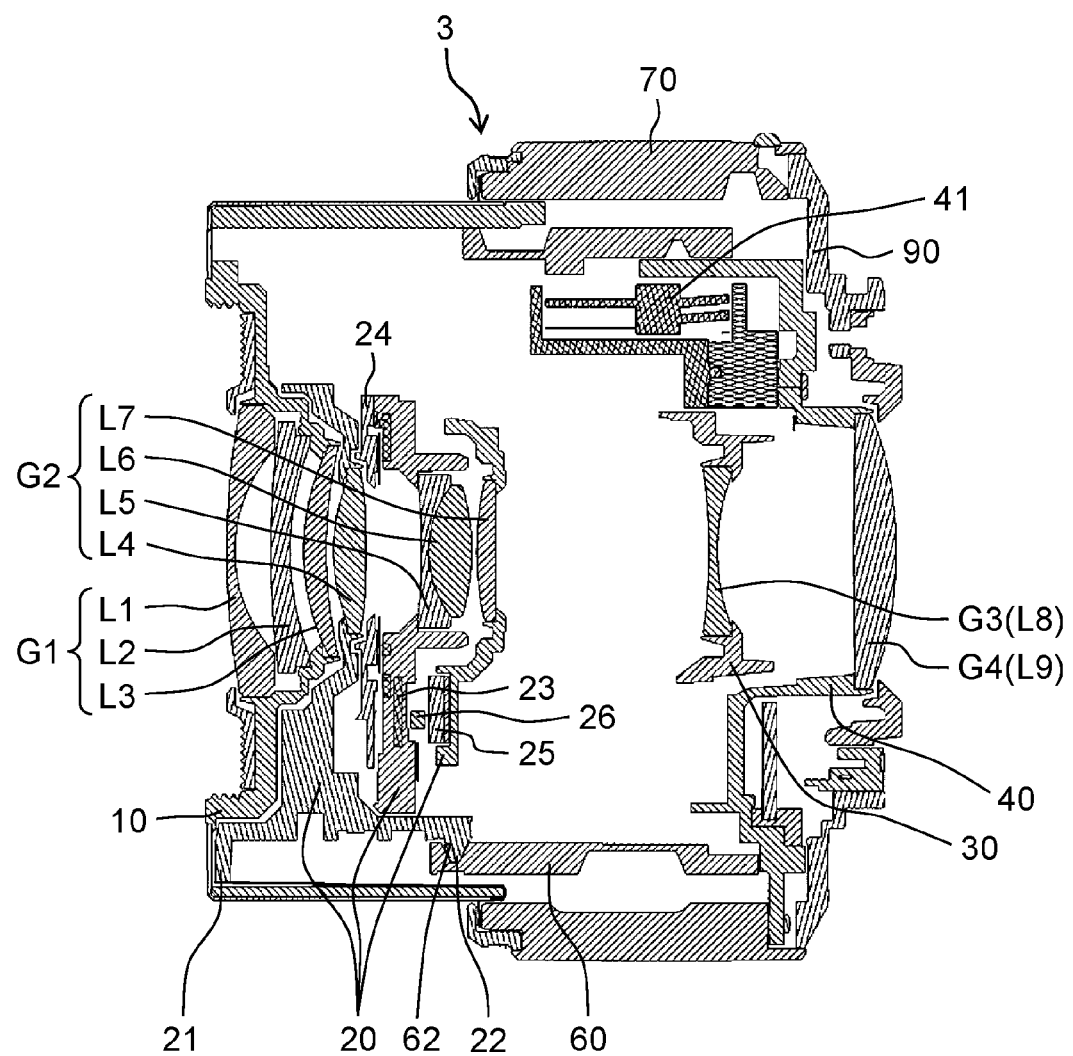
FIG. 8 is a cross-sectional view showing the lens barrel at a telescopic end according to the exemplary embodiment.

FIG. 3 is a perspective view showing lens barrel 3 according to the exemplary embodiment, as viewed slantwise from the front; FIG. 4 is a perspective view showing lens barrel 3 according to the exemplary embodiment, as viewed slantwise from the back; FIG. 5 is an exploded perspective view showing lens barrel 3 according to the exemplary embodiment; FIG. 6 is a cross-sectional view showing lens barrel 3 in a stored state according to the exemplary embodiment; FIG. 7 is a cross-sectional view showing lens barrel 3 at a wide angle end according to the exemplary embodiment; and FIG. 8 is a cross-sectional view showing lens barrel 3 at a telescopic end according to the exemplary embodiment.

Lens barrel 3 is designed for a collapsible zoom lens. As shown in FIG. 3, lens barrel 3 includes barrel main body 3A and zoom lever switch 71 and focus lever switch 72 that are disposed at barrel main body 3A. Zoom lever switch 71 is an operational unit, by which a user adjusts a zoom magnification. Focus lever switch 72 is an operational unit, by which a user adjusts a focus.

As shown in FIG. 4, the disposed at the rear end of lens barrel 3 is lens mount 90 of a bayonet type. Lens barrel 3 is mechanically and electrically connected to camera main body 2 (see FIG. 2) via lens mount 90 and body mount 2a (see FIG. 2).

As shown in FIG. 5, barrel main body 3A is provided with an optical system including a plurality of lenses (see FIGS. 6 to 8), a plurality of lens frames that holds the lenses, cam frame 60, outer frame 70, a printed circuit (not shown), and lens mount 90.

The plurality of lens frames includes first group lens frame 10, second group lens frame 20, third group lens frame 30, and fourth group lens frame 40. Cam frame 60 transmits drive force to first group lens frame 10, second group lens frame 20, third group lens frame 30, and fourth group lens frame 40. Outer frame 70 contains first group lens frame 10, second group lens frame 20, third group lens frame 30, fourth group lens frame 40, and cam frame 60.

Here, first group lens frame 10 corresponds to a first lens frame according to the present disclosure, and second group lens frame 20 corresponds to a second lens frame according to the present disclosure.

In particular, as shown in FIGS. 6 to 8, the optical system is a zoom lens system for forming an optical image of an object, and includes first group lens G1 to fourth group lens G4. First group lens G1 includes first lens L1 to third lens L3. Second group lens G2 includes fourth lens L4 to seventh lens L7. Third lens G3 includes eighth lens L8. Fourth group lens G4 includes ninth lens L9.

First group lens G1, second group lens G2, third group lens G3, and fourth group lens G4 are held in first group lens frame 10, second group lens frame 20, third group lens frame 30, and fourth group lens frame 40, respectively.

First group lens G1 and second group lens G2 are zoom lenses. Seventh lens L7 in second group lens G2 also functions as a image blur correction lens. Third group lens G3 is a focus lens.

Here, first group lens G1 corresponds to a first lens group according to the present disclosure, and second group lens G2 corresponds to a second lens group according to the present disclosure.

As shown in FIG. 3, outer frame 70 is a cylindrical member. At the inner circumferential surface of outer frame 70, a plurality of outer frame cam grooves extending along a predetermined trajectory and a plurality of outer frame straight grooves extending in the direction of optical axis AX are formed. Outer frame 70 forms an external portion exposed to the outside in lens barrel 3.

As shown in FIG. 4, lens mount 90 is an annular member having an opening at the center of lens mount 90, and can be mounted on body mount 2a (see FIG. 2). Lens mount 90 is fixed to the rear end of outer frame 70 via a plurality of screws 91.

As shown in FIG. 5, cam frame 60 is a cylindrical member. At the outer peripheral surface of cam frame 60, a plurality of first cam grooves 61 extending along a predetermined trajectory (only one is shown) and a plurality of cam pins 63 projecting outward from the rear end are formed. Moreover, at the inner circumferential surface of cam frame 60, a plurality of second cam grooves 62 (only one is shown) extending along a predetermined trajectory and inner gear 64 are formed. Inner gear 64 is formed in a circumferential direction between two adjacent second cam grooves 62.

Figure 9:
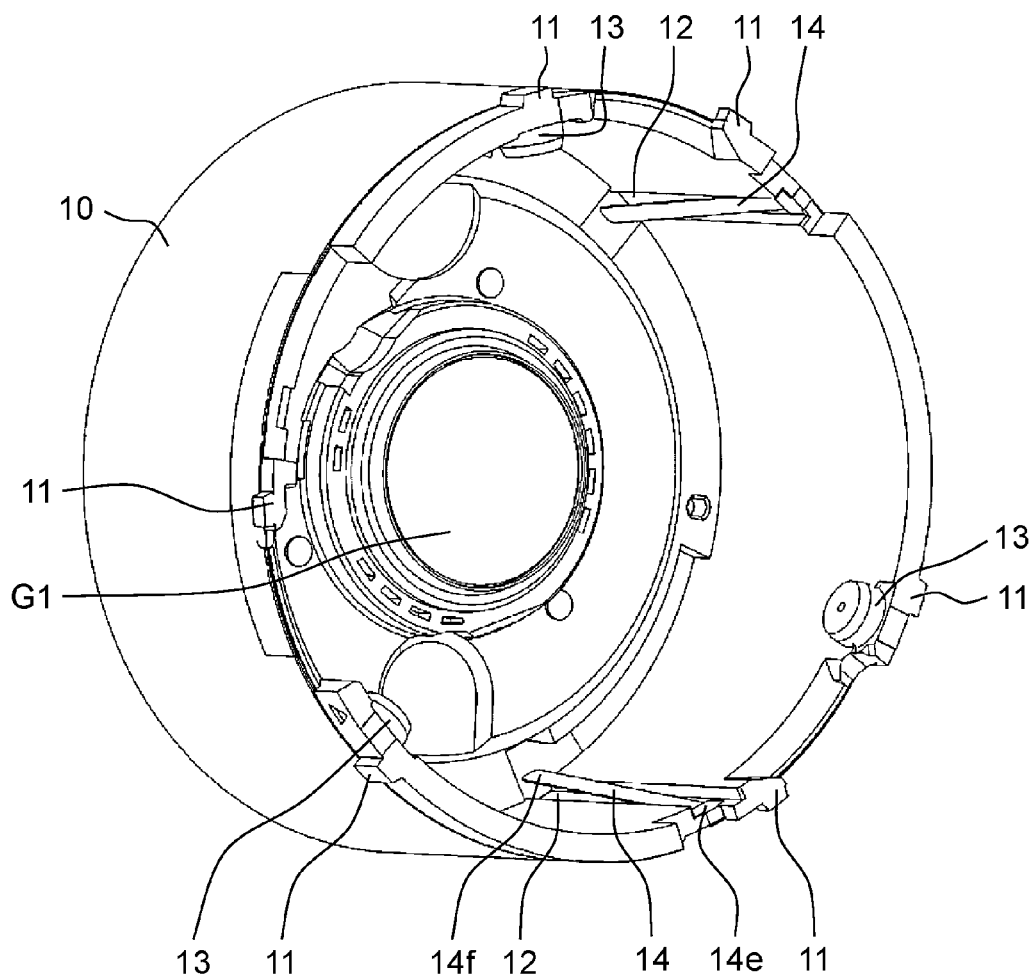
FIG. 9 is a perspective view showing a first group lens frame according to the exemplary embodiment, as viewed slantwise from the back.
Figure 10A:
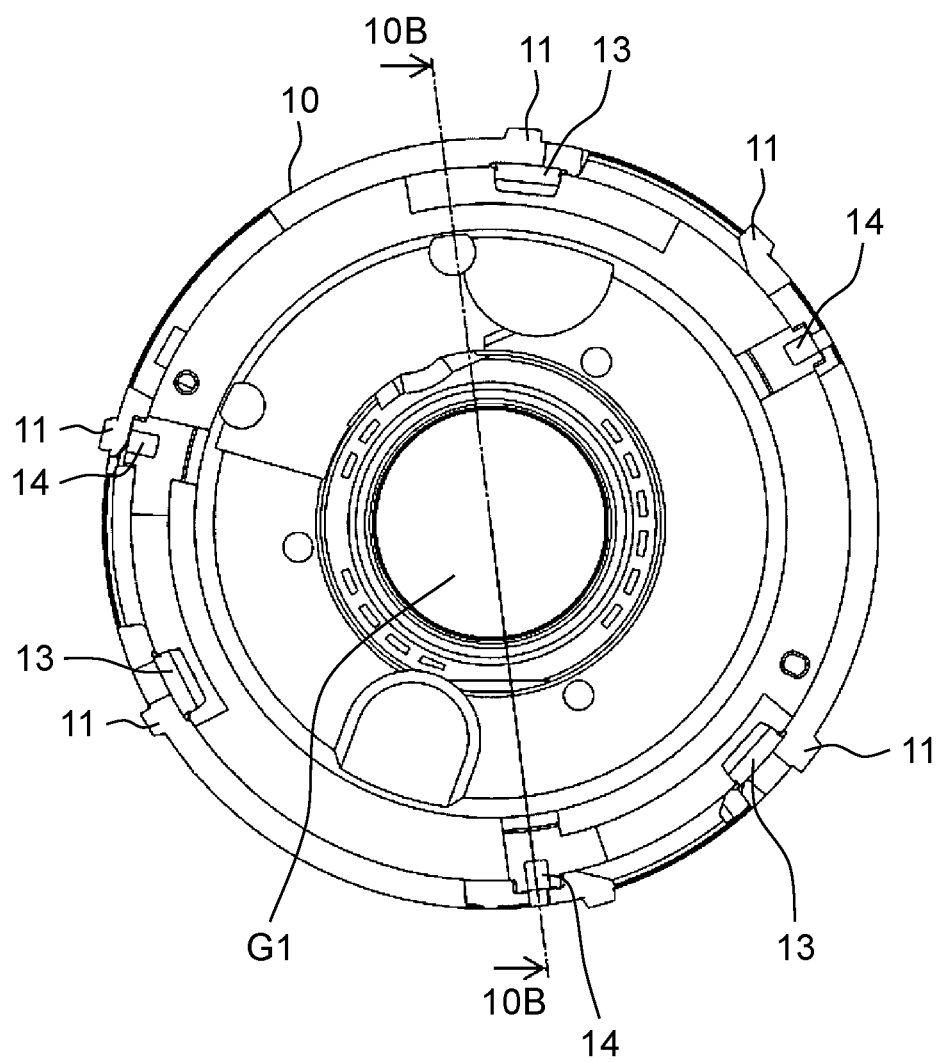
FIG. 10A is a view showing the first group lens frame according to the exemplary embodiment, as viewed from the back.

FIG. 9 is a perspective view showing first group lens frame 10 according to the exemplary embodiment, as viewed slantwise from the back; FIG. 10A is a view showing first group lens frame 10 according to the exemplary embodiment, as viewed from the back; and FIG. 10B is a cross-sectional view taken along line 10B-10B of FIG. 10A.

Figure 10B:
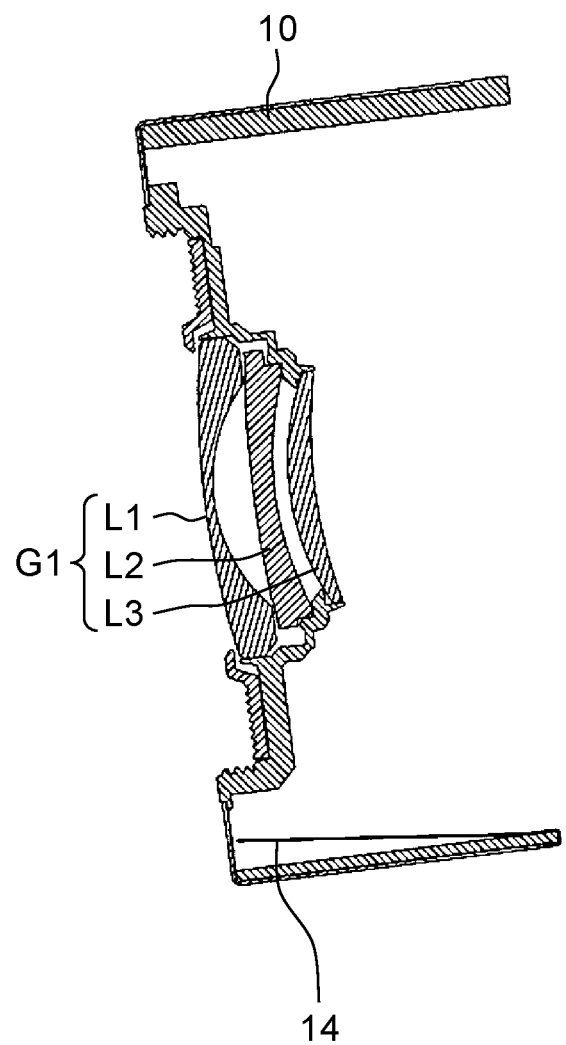
FIG. 10B is a cross-sectional view taken along a line 10B-10B of FIG. 10A.

As shown in FIGS. 9, 10A, and 10B, first group lens frame 10 is a cylindrical member, and holds first group lens G1. At the outer peripheral surface of first group lens frame 10, a plurality of projections 11 projecting outward from a rear end are formed. At the inner circumferential surface of first group lens frame 10 are disposed a plurality of straight grooves 12 extending in the direction of optical axis AX, a plurality of cam pins 13 projecting inward from the rear end, and a plurality of leaf springs 14 (one example of a resilient member) extending in the direction of optical axis AX. Disk springs 14 are disposed along straight grooves 12, respectively. One end 14e of each of leaf springs 14 is secured to the bottom of straight groove 12 at the rear end of first group lens frame 10, leaf spring 14 extends forward along straight groove 12, and the other end 14f of leaf spring 14 is positioned in the vicinity of the inner wall surface at the front portion of first group lens frame 10. Disk spring 14 is made of, for example, stainless steel. Here, three straight grooves 12 and three leaf springs 14 are arranged at substantially equal intervals in the circumferential direction of the inner circumferential surface of first group lens frame 10.

Here, three leaf springs 14 are formed between first group lens frame 10 and second group lens frame 20 in such a manner as to urge second group lens frame 20 (see FIG. 6, the details will be described later) inward against first group lens frame 10. Specifically, three leaf springs 14 are fixed in such a manner as to urge second group lens frame 20 toward optical axis AX.

Incidentally, in the case where leaf spring 14 is used as a resilient member, the number of straight grooves 12 and the number of leaf springs 14 need not be three, as in the present exemplary embodiment, and therefore, it may be two or more. In this case, like the present exemplary embodiment, it is desirable that the plurality of straight grooves 12 and the plurality of leaf springs 14 should be arranged at substantially equal intervals in the circumferential direction of the inner circumferential surface of first group lens frame 10. Furthermore, it is desirable that the plurality of leaf springs 14 should be fixed in such a manner as to urge second group lens frame 20 toward optical axis AX.

As shown in FIG. 6, second group lens frame 20 is an annular member having an opening at the center of group lens frame 20, and holds second group lens G2 at the opening. Second group lens frame 20 includes a plurality of projections 21 (only one is shown) projecting outward from a front end and a plurality of cam pins 22 (only one is shown) projecting outward from a rear end. Second group lens frame 20 includes coil 23 and aperture mechanism 24. In second group lens frame 20, a frame holding seventh lens L7 is also referred to as an OIS (Optical Image Stabilizer) frame. The OIS frame includes magnet 25 at a position facing coil 23 and Hall element 26 interposed between coil 23 and magnet 25. The OIS frame is movably held within a plane perpendicular to optical axis AX and is driven by a magnetic force generated by coil 23, thereby being moved within a plane perpendicular to optical axis AX.

As shown in FIG. 5, these first group lens frame 10, second group lens frame 20, and cam frame 60 are contained inside of outer frame 70 in an integrally incorporated state. In particular, cam frame 60 is contained inside of first group lens frame 10. At this time, cam pins 13 (see FIG. 9) at first group lens frame 10 are fitted to first cam grooves 61 formed at cam frame 60. Moreover, cam pins 63 formed at cam frame 60 project beyond first group lens frame 10 rearward of first group lens frame 10. Second group lens frame 20 is contained inside of cam frame 60. Specifically, second group lens frame 20 is disposed inside of first group lens frame 10. At this time, cam pins 22 are fitted to second cam grooves 62 formed at cam frame 60. Moreover, projections 21 project outward of cam frame 60 at the front portion of cam frame 60, and are fitted to straight grooves 12 (see FIG. 9) formed at first group lens frame 10. First group lens frame 10 is contained inside of outer frame 70. At this time, projections 11 are fitted to outer frame straight grooves formed at the inner circumferential surface of outer frame 70. Moreover, projections 11 project outward of first group lens frame 10. Cam pins 63 of cam frame 60 are fitted to outer frame cam grooves formed at the inner circumferential surface of outer frame 70.

First group lens frame 10 is arranged closer to an object to be picked up by pickup device 1 than second group lens frame 20. Specifically, first group lens G1 is arranged closer to an object to be picked up by pickup device 1 than second group lens G2.

As shown in FIG. 6, fourth group lens frame 40 is an annular member having an opening at the center of fourth group lens frame 40, and holds fourth group lens G4 at the opening. Fourth group lens frame 40 is fixed to the rear end of outer frame 70 via screws. Two shafts extending forward in the direction of optical axis AX inside of outer frame 70 are disposed at fourth group lens frame 40. Fourth group lens frame 40 includes a zoom motor for driving cam frame 60 via zoom motor gear 41 and a focus motor for driving third group lens frame 30.

As shown in FIG. 6, third group lens frame 30 is an annular member having an opening at the center of third group lens frame 30, and holds third group lens G3 at the opening. Third group lens frame 30 is supported via the two shafts disposed in the direction of optical axis AX of fourth group lens frame 40 in such a manner as to straight advance in the direction of optical axis AX. Third group lens frame 30 includes a rack that engages with a lead screw at the focus motor. In other words, third group lens frame 30 is driven by the focus motor. The focus motor adjusts the focus of lens barrel 3.

<2-2. Operation of Lens Barrel>

In FIG. 6, in lens barrel 3 configured as described above, the zoom motor rotationally drives cam frame 60 via zoom motor gear 41. Cam frame 60 that is rotationally driven is rotated along the outer frame cam grooves formed at outer frame 70 while being moved, in rotational movement, in the direction of optical axis AX.

In first group lens frame 10, cam pins 13 (see FIG. 9) are fitted to first cam grooves 61 (see FIG. 5) formed at cam frame 60 while projections 11 (see FIG. 9) are fitted to the outer frame straight grooves formed at the inner circumferential surface of outer frame 70, so that first group lens frame 10 cannot be rotated with respect to outer frame 70. As a consequence, when cam frame 60 is rotated, first group lens frame 10 is moved in the direction of optical axis AX according to the relative movement of cam pins 13 with respect to first cam grooves 61 without any rotation.

Moreover, in second group lens frame 20, cam pins 22 are fitted to second cam grooves 62 formed at cam frame 60 while projections 21 are fitted to straight grooves 12 (see FIG. 9) formed at first group lens frame 10, so that second group lens frame 20 cannot be rotated with respect to first group lens frame 10. As a consequence, when cam frame 60 is rotated, second group lens frame 20 is moved in the direction of optical axis AX, without any rotation, according to the relative movement of cam pins 22 with respect to second cam grooves 62. That is to say, second group lens frame 20 can be moved relatively to first group lens frame 10 in the direction of optical axis AX.

With the above-described operation, each of first group lens frame 10 and second group lens frame 20 is moved in the direction of optical axis AX due to the rotational drive of cam frame 60, and therefore, the focal distance of lens barrel 3 is adjusted.

The OIS frame with respect to seventh lens L7 of second group lens G2 is driven by coil 23, and then, is moved within a plane perpendicular to optical axis AX. Thus, an image blur is corrected.

In addition, third group lens frame 30 is driven by the focus motor independently of first group lens frame 10 and second group lens frame 20, and then, is moved in the direction of optical axis AX. Thus, the focus of lens barrel 3 is adjusted.

More specifically, first group lens frame 10 and second group lens frame 20 are located at the storage positions shown in FIG. 6 when a power source of lens barrel 3 is off. When the power source of lens barrel 3 is turned on, each of first group lens frame 10 and second group lens frame 20 is moved from the storage positions to the wide-angle end, as shown in FIG. 7, is due to the rotational drive of cam frame 60. When a user operates zoom lever switch 71 (see FIG. 1), an input signal according to an operational amount is input into a lens microcomputer on a printed circuit board. The lens microcomputer outputs a drive signal to the zoom motor in response to the input signal. The zoom motor is operated in response to the drive signal, thereby rotationally driving cam frame 60. As a consequence, first group lens frame 10 and second group lens frame 20 are moved in the direction of optical axis AX between the wide-angle end and the telescopic end shown in FIG. 8. In this manner, the zoom magnification is manually adjusted.

Here, when second group lens frame 20 is moved relatively to first group lens frame 10 in the direction of optical axis AX, at least a part of the resilient member between one end 14e (see FIG. 9) and the other end 14f (see FIG. 9) of each of leaf springs 14 fixed to first group lens frame 10 is brought into contact with second group lens frame 20. For example, the at least part of each leaf spring 14 between the one end 14e and the other end 14f serves as a leaf spring that is brought into contact with a portion of the second group lens frame 20 (as exemplified in FIG. 6). As a consequence, second group lens frame 20 can be moved relatively to first group lens frame 10 in the direction of optical axis AX, and furthermore, the radial position of second group lens frame 20 with respect to first group lens frame 10 is restricted.

Third group lens frame 30 is driven in association with first group lens frame 10 and second group lens frame 20. Specifically, the lens microcomputer moves third group lens frame 30 to a position at which the focal state can be maintained before and after the focal distance is changed based on a previously stored tracking table. In other words, upon receiving the input signal, the lens microcomputer not only outputs the drive signal to the zoom motor but also outputs a drive signal to the focus motor. Consequently, third group lens frame 30 is moved to the position according to the positions of first group lens frame 10 and second group lens frame 20.

Here, a user can operate focus lever switch 72 (see FIG. 1) to manually adjust the position of fourth group lens frame 40. Specifically, when focus lever switch 72 is operated, an input signal according to an operational amount is input into the lens microcomputer on the printed circuit. The lens microcomputer outputs a drive signal to the focus motor in response to the input signal. The focus motor is operated in response to the drive signal, and moves third group lens frame 30 in the direction of optical axis AX. In this manner, the focal state is manually adjusted.

<2-3. Effects and the Like>

As described above, in FIG. 6, leaf springs 14 are disposed along straight grooves 12 (see FIG. 9) formed at first group lens frame 10, respectively, and projections 21 formed at second group lens frame 20 are fitted to straight grooves 12 formed at first group lens frame 10, respectively. In picking up an image, the position of second group lens G2 is changed according to the zoom magnification, so that second group lens G2 is positioned at a predetermined position between the wide-angle end shown in FIG. 7 and the telescopic end shown in FIG. 8. When second group lens G2 is positioned between the wide-angle end and the telescopic end, projections 21 formed at second group lens frame 20 are in contact with leaf springs 14 that urge second group lens frame 20 inward against the first group lens frame. As a consequence, in the case where lens barrel 3 is vibrated by an influence from the outside, the radial position of second group lens frame 20 with respect to first group lens frame 10 is restricted because of the presence of leaf springs 14, and therefore, second group lens frame 20 is vibrated according to the vibration of first group lens frame 10. In other words, first group lens G1 and second group lens G2 are vibrated in the same (or substantially the same) vibration direction (i.e., vibrated in the same or substantially the same phase).

Here, three leaf springs 14 are arranged at substantially equal intervals in the circumferential direction at the inner circumferential surface of first group lens frame 10. Moreover, three leaf springs 14 are fixed in such a manner as to urge second group lens frame 20 toward optical axis AX. As a consequence, the forces of three leaf springs 14 uniformly function to urge second group lens frame 20 toward optical axis AX. Accordingly, when the center of first group lens frame 10 is positioned on optical axis AX, the center of second group lens frame 20 is also positioned on optical axis AX.

Without leaf spring 14, when lens barrel 3 is vibrated due to an influence from the outside, the radial position of second group lens frame 20 with respect to first group lens frame 10 is not restricted, and therefore, first group lens G1 and second group lens G2 are not always vibrated in the same phase. In the case where first group lens G1 and second group lens G2 are vibrated in different vibration directions, particularly in the case where they are vibrated in vibration directions reverse to each other (they are vibrated in opposite phases), a blur occurs on an image to be picked up (an image blur). In contrast, according to the technique of the present disclosure, first group lens G1 and second group lens G2 are vibrated in the same phase, thus suppressing the occurrence of an image blur. For example, in the case where pickup device 1 is mounted on a flying object that is moved due to the rotation of a propeller by means of a gimbal, and then, picks up an image, a high frequency vibration (a vibration of 50 Hz to 500 Hz) peculiar to the flying object occurs on pickup device 1 due to the rotation of the propeller or an influence of the gimbal. Even in the case where a high frequency vibration occurs on pickup device 1, the occurrence of an image blur can be suppressed in pickup device 1 using lens barrel 3 in the present exemplary embodiment. Incidentally, also in the case where first group lens G1 and second group lens G2 are vibrated in substantially the same phase, the occurrence of an image blur can be suppressed.

The OIS frame holding seventh lens L7 in the second group lens frame is not fixed to a lens frame (assuming a second group front frame) holding fourth lens L4 to sixth lens L6, but is held by a magnetic force. Therefore, the second group front frame and the OIS frame are not vibrated in the same phase, and therefore, the effect of suppressing an image blur may be reduced. In this case, the OIS frame is fixed to the second group front frame, thereby eliminating the function of image blur correction by seventh lens L7, so that the second group front frame and the OIS frame are vibrated in the same phase. Moreover, first group lens frame 10 and second group lens frame 20 are vibrated in the same phase by means of leaf springs 14, thus enhancing the effect of suppressing an image blur.

In comparison with the case where second group lens G2 is positioned closer to the wide-angle end, an image is more likely to be subjected to the adverse influence of the vibration of lens barrel 3 and, eventually image blur, in the case where second group lens G2 is positioned closer to the telescopic end. In view of this, one end 14e of each of leaf springs 14 is fixed to the rear end of first group lens frame 10 (see FIG. 9), and thus, the flexure of leaf spring 14 becomes larger as second group lens G2 is positioned closer to the telescopic end. In this manner, the urging force of leaf spring 14 against second group lens frame 20 can be increased, thus effectively suppressing an image blur.

In the present exemplary embodiment, leaf springs 14 are disposed between first group lens frame 10 and the second group lens frame so that first group lens G1 and second group lens G2 are vibrated in the same phase. However, leaf springs 14 may be disposed such that other lens groups that are combined to markedly influence the occurrence of an image blur are vibrated in the same phase.

<3. Conclusion>

According to the present exemplary embodiment, lens barrel 3 is provided with the first lens frame (first group lens frame 10) holding the first lens group (first group lens G1), the second lens frame (second group lens frame 20) holding the second lens group (second group lens G2), and the resilient members (leaf springs 14). The second lens frame is disposed inside of the first lens frame, and furthermore, can be moved relatively to the first lens frame in the direction of optical axis AX. The resilient members are disposed between the first lens frame and the second lens frame in such a manner as to urge the second lens frame inward against the first lens frame. With this configuration, in the case where lens barrel 3 is vibrated due to an influence from the outside, first group lens G1 and second group lens G2 are vibrated in the same or substantially the same phase, so that the occurrence of an image blur on an image to be picked up can be suppressed.

<4. Other Exemplary Embodiments>

As described above, the exemplary embodiment has been described as an example of the technique disclosed in the present application. However, the technique in the present disclosure is not limited to the embodiment, but is applicable to other exemplary embodiments that are subjected to modification, replacement, addition, omission, or the like. Other exemplary embodiments will be described below.

In the above-described exemplary embodiment, the description has been given of the example in which leaf springs 14 fixed to first group lens frame 10 are used as the resilient members. However, the resilient members are not limited to leaf springs 14. For example, resilient members shown in FIG. 11 and FIG. 12 may be used.

Figure 11:
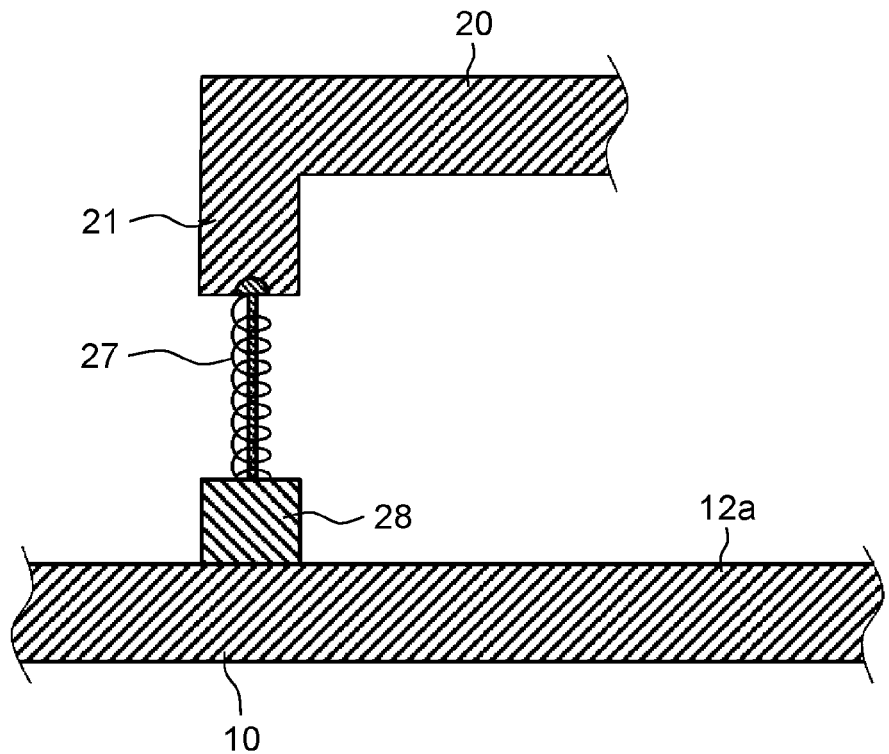
FIG. 11 is a view explanatory of another example of a resilient member according to the exemplary embodiment.
Figure 12:
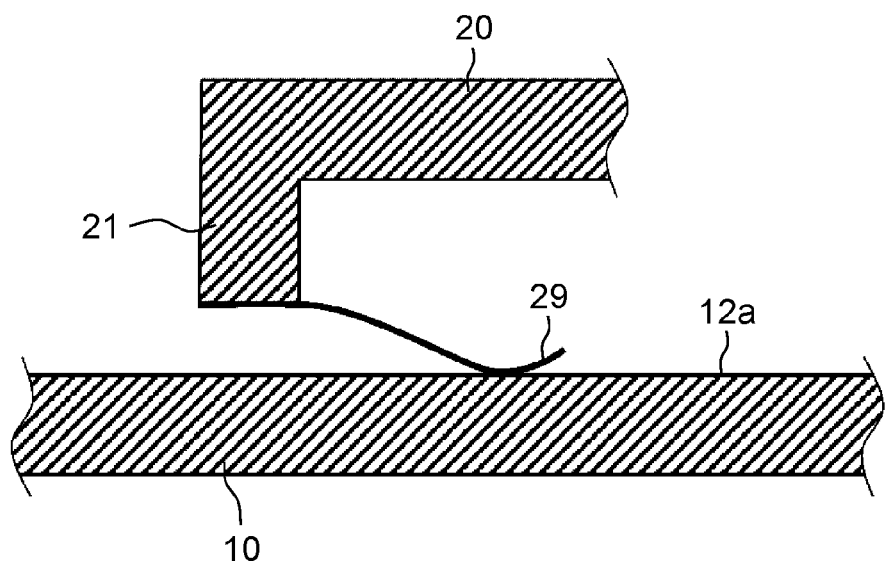
FIG. 12 is a view explanatory of a further example of a resilient member according to the exemplary embodiment.

FIG. 11 and FIG. 12 are views explanatory of other examples of the resilient member according to the exemplary embodiment. FIG. 11 and FIG. 12 show a tip portion of projection 21 formed at second group lens frame 20 and bottom 12*a* of straight groove 12 (see FIG. 9) of first group lens frame 10.

As shown in FIG. 11, coil spring 27 is fixed to the tip of projection 21 formed at second group lens frame 20, and contact 28 in contact with bottom 12*a* of straight groove 12 is disposed at the tip of coil spring 27. Coil spring 27 and contact 28 exemplify a resilient member. With this configuration, coil spring 27 and contact 28 urge second group lens frame 20 inward against first group lens frame 10.

Alternatively, as shown in FIG. 12, leaf spring 29 (exemplifying a resilient member) is fixed to the tip of projection 21 formed at second group lens frame 20. With this configuration, leaf spring 29 urges second group lens frame 20 inward against first group lens frame 10. With the configuration shown in FIG. 11 or FIG. 12, even in the case where lens barrel 3 is vibrated, it is possible to suppress occurrence of a blur on an image to be picked up.

In the above-described exemplary embodiment, the example in which the plurality of resilient members is used has been described. However, what is required is only to have at least one resilient member. For example, a rubber resilient member integrally formed into a ring may be disposed between first group lens frame 10 and second group lens frame 20 in such a manner as to urge second group lens frame 20 inward.

Here, the above-described exemplary embodiments are essentially preferable examples, and do not intend to restrict the scope of the present disclosure, its application, or its usage.

As described above, the present disclosure is useful for the lens barrel that electrically drives the lens and the like.

What is claimed is:

1. A lens barrel comprising:
a first lens frame that holds a first lens group;
a second lens frame that holds a second lens group; and
a resilient member that has one end fixed to the first lens frame, and at least a part of the resilient member between the one end and another end serves as a leaf spring that is brought into contact with a portion of the second lens frame,
wherein the second lens frame is disposed in the first lens frame and, is movable relatively to the first lens frame along an optical axis, and
wherein the resilient member is disposed between the first lens frame and the second lens frame in such a manner that the leaf spring urges the portion of the second lens frame radially inward.

2. The lens barrel according to claim 1, wherein the second lens group has a image blur correction lens, and the first lens group is disposed closer to an object than the second lens group is.

* * * * *